United States Patent
Malshe et al.

(10) Patent No.: US 11,124,653 B2
(45) Date of Patent: Sep. 21, 2021

(54) BIOFILLER FOR RUBBER REINFORCEMENT

(71) Applicant: GODAVARI BIOREFINERIES LTD., Maharashtra (IN)

(72) Inventors: Vinod Malshe, Mumbai (IN); Sangeeta Srivastava, Mumbai (IN); Manisha Jadhav, Mumbai (IN)

(73) Assignee: GODAVARI BIOREFINERIES LTD., Maharashtra (IN)

( * ) Notice: Subject to any disclaimer, the term of this patent is extended or adjusted under 35 U.S.C. 154(b) by 480 days.

(21) Appl. No.: 15/739,976

(22) PCT Filed: Jun. 24, 2016

(86) PCT No.: PCT/IN2016/050200
§ 371 (c)(1),
(2) Date: Dec. 26, 2017

(87) PCT Pub. No.: WO2017/002136
PCT Pub. Date: Jan. 5, 2017

(65) Prior Publication Data
US 2018/0187013 A1    Jul. 5, 2018

(30) Foreign Application Priority Data

Jun. 27, 2015  (IN) .................. 1067/MUM/2015

(51) Int. Cl.
| | |
|---|---|
| *B60C 1/00* | (2006.01) |
| *C08H 8/00* | (2010.01) |
| *C08K 3/04* | (2006.01) |
| *C08L 21/00* | (2006.01) |
| *C08L 97/00* | (2006.01) |
| *C08L 97/02* | (2006.01) |
| *C08L 7/00* | (2006.01) |

(52) U.S. Cl.
CPC .......... *C08L 97/02* (2013.01); *B60C 1/0016* (2013.01); *C08H 8/00* (2013.01); *C08K 3/04* (2013.01); *C08L 7/00* (2013.01); *C08L 21/00* (2013.01); *C08L 97/005* (2013.01); *C08L 2205/24* (2013.01)

(58) Field of Classification Search
CPC .......... C08H 8/00; C08L 97/005; C08L 97/02
See application file for complete search history.

(56) References Cited

U.S. PATENT DOCUMENTS

| | | |
|---|---|---|
| 3,111,513 A | 11/1963 | Battista et al. |
| 3,697,364 A | 10/1972 | Boustany et al. |
| 4,026,744 A | 5/1977 | Elmer |
| 2012/0232186 A1 | 9/2012 | Kamada |

FOREIGN PATENT DOCUMENTS

| | | | |
|---|---|---|---|
| CN | 103756060 A | | 4/2014 |
| GB | 892744 A | * | 3/1962 |
| JP | H 107841 A | | 1/1998 |
| JP | H 11209439 A | | 8/1999 |
| JP | 2001123017 | | 5/2001 |
| JP | 2005146223 A | | 6/2005 |
| JP | 2005162865 A | | 6/2005 |
| WO | WO 2014/178911 A1 | | 11/2014 |
| WO | WO2014178911 A1 | * | 11/2014 |

OTHER PUBLICATIONS

Gruntfest, I.J. et al. Textiles Research Journal vol. 18(11) pp. 643-650 (Year: 1948).*
International Search Report, dated Dec. 8, 2016 for corresponding International Application No. PCT/IN2016/050200.
Written Opinion of ISA, dated Dec. 8, 2016 for corresponding International Application No. PCT/IN2016/050200.
All et al., "Hydrophobic treatment on natural fibers and their composites" Journal of Industrial Textiles (May 2016) [online] [retrieved on Nov. 7, 2016]. Retrieved from the Internet <www.researchgate.net/publication/303437997> entire document.
Adel et al. "Characterization of microcrystalline cellulose prepared from lignocellulosic materials. Part 1. Acid catalyzed hydrolysis" Bioresource Technology, vol. 101, No. 12, p. 4446-4455 (Feb. 24, 2010) entire document.
Saba et al., "A Review on Potentiality of Nano Filler/Natural Fiber Filled Polymer Hybrid Composites" Polymers, vol. 6, No. 8, p. 2247-2273 (Aug. 22, 2014) entire document.

* cited by examiner

*Primary Examiner* — Irina S Zemel
*Assistant Examiner* — Jeffrey S Lenihan
(74) *Attorney, Agent, or Firm* — Intellectual Property Law Group LLP

(57) ABSTRACT

A biofiller for rubber reinforcement; said biofiller is surface treated up to 10% by weight of microcrystalline lignocellulose with aldehyde and/or ketone. The said biofiller has economic significance as well as reduces pollution as it replaces 2% carbon black from the rubber composition which is substantial amount after reviewing overall use of carbon black in rubber industries such as tyre industry, worldwide. A rubber composition comprising the said biofiller and its various applications such as tyre, shoes, bags, belts, etc.

14 Claims, 1 Drawing Sheet

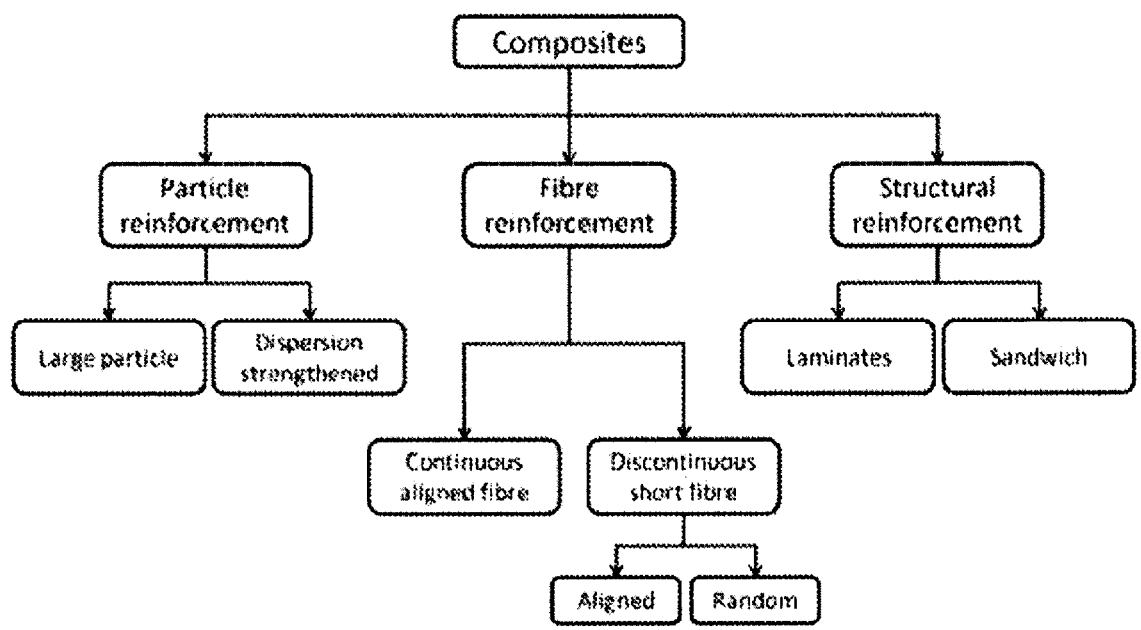

BIOFILLER FOR RUBBER REINFORCEMENT

CROSS-REFERENCE TO RELATED APPLICATIONS

This application is a U.S. National Phase application, under 35 U.S.C. § 371, of International Application no. PCT/IN2016/050200, with an international filing date of Jun. 24, 2016, and claims benefit of India Application no. 1067/MUM/2015 filed on Jun. 27, 2015, and which are hereby incorporated by reference for all purposes.

This application claims priority from Indian Patent Application No. 1067/MUM/2015 filed on Jun. 27, 2015.

FIELD OF THE INVENTION

The present invention relates to a biofiller for rubber reinforcement.

The present invention also relates to a method for the preparation of the biofiller from lignocellulose and aldehyde and/or ketone in the presence of alkali.

The said biofiller intends to substantially replace carbon black in reinforced rubber. The said biofiller is efficient, biodegradable, economic and environment friendly.

BACKGROUND OF THE INVENTION

Rubbers or elastomers have remarkable properties. By embedding particles, short or long fibres or textiles, the characteristics can be transformed and tailored to give extremely useful products in a wide range of applications. Specifically, by forming such rubber composites, major changes can be made to force-deformation behaviour (e.g. stiffness, damping and anisotropy) strength, fatigue and wear characteristics. The development of such rubber composites remains a principal route for innovation in rubbery materials, enabling new usages or improved technical performance or lower cost in existing applications.

Reinforcement is usually defined as improvement in abrasion, tear, cutting and rupture resistance, in stiffness and hardness of vulcanized compounds through incorporation of finely divided mineral particles. The most important factor in the capability of certain minerals to impart reinforcement to elastomers is the average particle size. Reinforcement is readily obtained with particle sizes smaller than 100 nm and semi reinforcement with particle sizes smaller than 1000 nm. Particles larger than 103 nm do not have reinforcing capabilities or have detrimental action. But the particles chemical structure is also a decisive factor. Carbon Black (CB) and silica have been used as the main reinforcing fillers that increase the usefulness of rubbers.

Silica has a number of hydroxyl groups on its surface, which results in strong filler-filler interactions and adsorption of polar materials by hydrogen bonds. Since intermolecular hydrogen bonds between hydroxyl groups on the surface of silica are very strong, silica can aggregate tightly exhibiting a complex geometry, from elementary particles to aggregates, agglomerates and clusters with dimensions from 0.05 to 40 μm. This property can cause a poor dispersion of silica in a rubber compound.

Carbon Black is the predominant reinforcing filler used in rubber compounds, and it is required to impart the necessary durability and strength to these products for longer lifetime and greatly improved performance. Carbon Black distributes and absorbs stress applied to a rubber component and improves its tensile strength, tear strength and abrasion resistance. Carbon Black can also impart electrical conductivity/resistivity to a rubber compound for dissipating static charge in dynamic applications such as automotive belts and Green Tires. However, the current International Agency for Research on Cancer (IARC) evaluation is that, "Carbon black is possibly carcinogenic to humans (Group 2B). Short-term exposure to high concentrations of carbon black dust may produce discomfort to the upper respiratory tract, through mechanical irritation.

The reinforcing capability of natural fibres has been known for centuries even before the mechanics of it was resolved, as is evident by primitive building materials such as straw-reinforced mud bricks. Natural fibres hold many advantages over synthetic fibres, as they are widely abundant, less costly, biodegradable and nonabrasive. In recent years, automotive industries in Europe and North America have been manufacturing vehicles with partially biodegradable parts, made from fibres such as kenaf, jute, flax and hemp and petroleum thermoplastics such as polypropylene and polyethylene. Cellulose fibre from pulp has also been studied and incorporated into composites with various applications.

Composite materials can be classified under three major categories based on the nature of the reinforcement. Particle reinforced composites consist of a soft matrix phase and a more brittle particulate phase that is evenly dispersed in the matrix. The reinforcing mechanism can either be dispersion-strengthening where very small particles block the movement of the matrix phase, such as thoria-dispersed nickel, or true particulate reinforcement where large particles impart unique properties to the matrix phase, such as rubber reinforced with carbon black to induce wear resistance. Structural composites include laminates, in which a continuous ply of each phase is stacked in various orientations and cured together, and sandwiches which contain three distinct layers, namely two thin facings and a thick core. Mallite is an example of a sandwich panel used in automotives in which aluminum facings are bonded to end-grain balsa wood. Reference is made to the classification of composite systems as illustrated in the single FIGURE of the drawing.

Fibre-reinforced composites (FRCs) consist of a brittle and strong fibrous reinforcing phase, surrounded by a more ductile matrix phase. Addition of fibres to a matrix phase improves strength, stiffness and fatigue resistance, as most of the force applied to the composite is carried by the fibre phase. FRCs can be furthered classified based on the nature of fibre reinforcement, as unidirectional continuous fibre reinforced composites have anisotropic properties, and are designed to give the best performance when the direction of applied load is parallel to the orientation of the fibres. Discontinuous short fibre composites may contain unidirectional or randomly aligned fibres, and demonstrate less load carrying ability than continuous fibre composites. The applications of fibre-reinforced composites are numerous, ranging from centuries-old straw-reinforced mud bricks, to fiberglass reinforcement in aerospace composite materials.

Thus, carbon black is primarily used as reinforcing filler in rubber or tyre industries. It effects in increasing tensile strength and resistance to wear and tear of the final product. According to Health hazard data available; chronic inhalation exposure to carbon black may result in temporary or permanent damage to lungs and heart. Pneumoconiosis has been found in workers engaged in the production of carbon black. Skin conditions such as inflammation of the hair follicles, and oral mucosal lesions have also been reported from skin exposure. Current evaluation of International Agency for Research on Cancer (IARC) is that, "Carbon black is possibly carcinogenic to humans (Group 2B)". Short-term exposure to high concentrations of carbon black dust may produce discomfort to the upper respiratory tract, through mechanical irritation.

Silica and other silanes substitutes to carbon black due to environmental friendly nature. These products reduce rolling resistance in tyres and at the same time improve fuel efficiency, hence they are increasingly finding usage in tyres market.

There are numerous Patents/Patent Applications disclosing fillers for reinforcement in rubber. JP2001123017 proposes addition of fraipontite-silica composite, in which each unit layer of fine lamina-form fraipontite crystal of metal aminosilicate is held around a silica particle, into rubber component, in order to efficiently remove water film on a surface of the ice.

JP2005162865 proposes addition of pulverized bamboo charcoal or the like, which has average particle diameter in a range of 10 µm to 500 µm, into the rubber composition, in order to further efficiently remove water film on a surface of the ice. Also, JP2005146223 discloses a method of manufacturing spherical porous particles that has high porosity and high strength, from cross-linking acrylate monomers. Thus obtained particles are considered to be preferably applicable in use for delustering and/or sintering.

JP1997 (H10)-007841A particularly proposes applying a rubber-to-particle adhesion promoter mainly comprised of mixture of resorcinol-formaldehyde resin prepolymer and latex (resorcinol-formaldehyde latex, i.e. RFL), on surfaces of the particles so as to cause chemical bonding between the surfaces of the particles and rubber of the tread part, thereby improving the scratching effect. It is additionally described as a mechanism for improving friction on ice, that "the particles are protruded from surface of the tread at a time the particles are contacted with road face" so as to "destroy thin-wall portions" (of ice covering the road face, which is derived from compressed snow).

US2012232186 relates to rubber composition and pneumatic tire wherein lignocellulosic or cellulosic powder is added into the rubber composition together with multi hollow particles. It also discloses an example of such rubber-adhesion improver is a resin liquid mainly comprised of a mixture of a resorcinol-formaldehyde resin prepolymer and RFL latex. It states addition to rubber a small amount of powder of porous carbonized material that is derived from lignocellulosic or cellulosic material. When added to rubber, the components are (1) the partially carbonized lignocellulosic or cellulosic powder, (2) the resin-treated lignocellulosic or cellulosic powder and (3) the porous carbonized material. Particle diameter of the powder of porous carbonized material derived from lignocellulosic or cellulosic material is preferably in a range of 30 µm to 300 µm.

Resin-treated lignocellulosic powder: Commercially available pulverized walnut shell ("SOFT GRIT #46" of Nippon Walnut Co., Ltd.) is surface-treated with the RFL liquid by a method based on disclosure of JP1998 (H10)-007841A. Average particle diameter of the powder after the treatment is about 300 µm.

U.S. Pat. No. 3,697,364 discloses discontinuous cellulose fiber to the matrix are generally those which bond cellulose cord to rubber and an adhesive called RFL used extensively for bonding 10 continuous fibers to rubber is a mixture of butadiene styrene-vinyl pyridine latex with the condensation product of resorcinol and formaldehyde in the presence of an alkali catalyst.

U.S. Pat. No. 4,026,744 discloses rubber compounds readily bonded to reinforcing elements, particularly tyre cords of glass fibers, using a one-step dip process in which the dip contains an alkaline aqueous dispersion of a mixture of a major amount by weight of a rubbery vinyl pyridine/styrene/butadiene terpolymer and a lignin sulfonate-resorcinol-formaldehyde reaction product.

Tyres and rubber products represent the major end-use applications, accounting for about 90% of global carbon black market. The growth in usage of carbon black is closely tied to the automotive industry and the production of tyres. Consumption of carbon black in tyres is expected to grow at a compounded annual rate of 3.6%. Demand for carbon black in paints, coatings and inks are expected to show upward trend. Virgin carbon black industry is likely to come under increased pressure from government and environmental groups, as this product is a significant greenhouse gas emitter.

Considering the risk of use of carbon black due to its carcinogenic nature and poor dispersion of silica, more and more research is being conducted for finding better options in fillers for reinforcement.

Hence, there is a need for the art for a biofiller for rubber reinforcement which is ecofriendly, economic, reproducible and simple.

OBJECTS OF THE PRESENT INVENTION

The primary object of the present invention is to provide a biofiller for rubber reinforcement.

Another object of the present invention is to provide a biofiller for rubber reinforcement; said biofiller is efficient, economic, biodegradable and eco-friendly.

Yet another object of the present invention is to provide a biofiller for rubber reinforcement; said biofiller replaces carbon black substantially from reinforced rubber.

Still another object of the present invention is to provide a method for the preparation of said biofiller; said process is simple or easy to carry out.

BRIEF DESCRIPTION OF THE DRAWING

The single FIGURE of the drawing is a diagram illustrating a classification of composite systems.

DETAILED DESCRIPTION OF THE INVENTION

Before the present invention is described, it is to be understood that this invention is not limited to any particular methodology and materials described, since these may vary as per the person skilled in the art. It is also to be understood that the terminology used in the description is for the purpose of describing the particular embodiments only, and is not intended to limit the scope of the present invention.

Before the present invention is described, it is to be understood that unless defined otherwise, all technical and scientific terms used herein have the same meaning as commonly understood by one of ordinary skill in the art to which this invention belongs. Further, it is to be understood that the present invention is not limited to the methodologies and materials similar or equivalent to those described herein and that those can be used in the practice or testing of the present invention, the preferred methods and materials are described, as these may vary within the specification indicated. Unless stated to the contrary, any use of the words such as "including," "containing," "comprising," "having" and the like, means "including without limitation" and shall not be construed to limit any general statement that it follows to the specific or similar items or matters immediately following it. Embodiments of the invention are not mutually exclusive, but may be implemented in various combinations. The described embodiments of the invention and the disclosed examples are given for the purpose of illustration rather than limitation of the invention as set forth the appended claims. Further the terms disclosed embodiments are merely exemplary methods of the invention, which may be embodied in various forms.

According to one of the embodiments of the present invention, it provides a biofiller for rubber reinforcement; said biofiller is surface treated microcrystalline lignocellulose with aldehyde and/or ketone.

Particularly the said biofiller for rubber reinforcement of the invention wherein microcrystalline lignocellulose is surface treated with aldehyde and/or ketone up to 10% by weight.

More particularly the said microcrystalline lignocellulose is surface treated with 1 to 10% by weight of aldehyde and/or ketone.

Particularly, microcrystalline lignocellulose used in the said biofiller is prepared by treating lignocellulose with 2 to 2.5 N hydrochloric acid at 80 to 100° C. for at least 100 to 120 minutes followed by filtering the solid so obtained and washing the solid with distilled water till neutral filtrate is obtained. The solid so obtained was dried at 80 to 90° C. It was then ground and sieved. Microcrystalline lignocellulose so obtained has particle size 40 to 60µ, surface area 1 to 20 $m^2$/gm and Aspect ratio(Mean): 1 to 2.

Particularly, lignocellulose solid was treated with 2.5 N HCl at 95° C. for 100 minutes. The reaction material obtained was filtered through RM filter and solid so obtained was washed with distilled water till we get neutralized filtrate/wash. The solid powder was dried at 85° C. It was then ground and sieved. The microcrystalline lignocellulose so obtained was used for further preparation of biofiller.

This microcrystalline lignocellulose is used further for preparing manufacturing biofiller of the invention.

Optionally, a lignin-formaldehyde/lignin-acetone resin may be used along with microcrystalline lignocellulose.

Particularly the said aldehyde and ketone are selected from, but not limited to, aliphatic, aromatic, heterocyclic, saturated, unsaturated, branched, unbranched aldehyde and ketone like formaldehyde, acetaldehyde, propanaldehyde, butanaldehyde, pentyl aldehyde, hexanaldehyde, heptanaldehyde, octanaldehyde, nonaldehyde, decanal, Sorbaldehyde, Crotonaldehyde, 5-Hydroxymethyl furfural, acrolein, acetone, butanone, pentanone, hexanone, heptanone, octanone, nonanone, decanone etc According to the invention, we have produced said biofiller by using different proportions of aldehyde and ketone in the surface treatment of the invention.

According to the preferred embodiment of the invention, there is provided "A", "B", "C", "D" and "E" and "F" biofiller wherein, "A" biofiller has the microcrystalline lignocellulose treated with 5% acetone;

"B" biofiller has the microcrystalline lignocellulose treated with 10% formaldehyde; and "C" biofiller has the microcrystalline lignocellulose treated with 10% lignin-formaldehyde and 10% formaldehyde.

"D" biofiller has the microcrystalline lignocellulose treated with 10% lignin-acetone and 10% acetone.

"E" biofiller is lignin-formaldehyde.

"F" biofiller has the microcrystalline lignocellulose treated with 2% 5-(Hydroxymethyl) furfural (HMF);

The reaction completion was monitored by titrimetric analysis for the consumption of acetone and formaldehyde by oximation.

The said biofiller is intended to replace carbon black filler for rubber reinforcement. Generally carbon black is used for rubber reinforcement. During the waste deposal of the used tyres, carbon black is recycled on pyrolysis. Further, carbon black is considered possibly carcinogenic to humans and classified as a Group 2B carcinogen, because there is sufficient evidence in experimental animals with inadequate evidence in human epidemiologic studies.

Subsequently, carbon black is used along with lignocellulose or cellulose bonded with resin formaldehyde latex or any other additive.

However, our objective is to substantially replace carbon black with said biofiller of the invention in rubber.

According to another embodiment of the present invention, it provides a method for the preparation of biofiller for rubber reinforcement;

said method comprises treating lignocellulose with dilute hydrochloric acid at 80 to 100° C. for at least 100 to 120 minutes to produce microcrystalline lignocellulose;

characterized that the microcrystalline lignocellulose is surface treated with 1 to 10% of aldehyde and/or ketone in presence of aqueous or alcoholic alkali to produce a biofiller.

Particularly the said process comprises preparing alkaline solution of aldehyde and ketone by mixing with aqueous or alcoholic alkali and adjusting the pH to 9 to 11 followed by treatment of microcrystalline lignocellulose with alkaline solution of aldehyde and ketone so as to obtain microcrystalline lignocellulose which is surface treated with 1 to 10% of aldehyde and/or ketone.

Preferably, microcrystalline lignocellulose is surface treated with aldehyde and/or ketone in presence of aqueous alkali at temperature 27 to 30° C. to produce a biofiller.

Particularly, microcrystalline lignocellulose so obtained is used for preparing said biofiller of the invention have particle size 1 to 60µ, surface area 1 to 20 $m^2$/gm and Aspect ratio (Mean): 1 to 2.

Optionally, a lignin-formaldehyde or lignin-acetone resin may be used along with microcrystalline lignocellulose Particularly the said aldehyde and ketone are selected from, but not limited to, aliphatic, aromatic, heterocyclic, saturated, unsaturated, branched, unbranched aldehyde and ketone like formaldehyde, acetaldehyde, propanaldehyde, butanaldehyde, pentyl aldehyde, hexanaldehyde, heptanaldehyde, octanaldehyde, nonaldehyde, decanal, Sorbaldehyde, Crotonaldehyde, 5-Hydroxymethyl furfural, acrolein, acetone, butanone, pentanone, hexanone, heptanone, octanone, nonanone, decanone, etc According to the preferred embodiment of the invention, there is provided "A" biofiller, where a surface of microcrystalline lignocellulose is treated with 5% acetone.

A method to prepare the "A" biofiller wherein, said process comprises preparing alkaline solution of acetone by mixing with (2 N) aqueous sodium hydroxide solution with acetone and adjusting the pH to 9 to 11 followed by treatment of microcrystalline lignocellulose with alkaline solution of acetone so as to obtain microcrystalline lignocellulose which is surface treated with 5% of acetone.

According to another preferred embodiment of the invention, there is provided "B" biofiller, where a surface of microcrystalline lignocellulose is treated with 10% formaldehyde.

A method to prepare the "B" biofiller wherein, said process comprises preparing alkaline solution of formaldehyde by mixing with (2 N) aqueous sodium hydroxide solution with formaldehyde and adjusting the pH to 9 to 11 followed by treatment of microcrystalline lignocellulose with alkaline solution of acetone so as to obtain microcrystalline lignocellulose which is surface treated with 10% of formaldehyde.

According to another preferred embodiment of the invention, there is provided "C" biofiller, where a surface of microcrystalline lignocellulose is treated with 10% formaldehyde and 10% lignin formaldehyde resin.

A method to prepare the "C" biofiller wherein, said process comprises preparing lignin-formaldehyde resin by treating lignin with formaldehyde in presence of 0.2% of aqueous sodium hydroxide solution at 23 to 30° C.;

preparing alkaline solution of formaldehyde by mixing with (2N) aqueous sodium hydroxide solution with formaldehyde and adjusting the pH to 9 to 11 followed by treatment of microcrystalline lignocellulose and lignin-formaldehyde resin to obtain microcrystalline lignocellulose which is surface treated with 10% of formaldehyde and lignin-formaldehyde resin.

Particularly, lignin-formaldehyde resin may be prepared by treating lignin solid (1.1 part) with 37% formaldehyde solution (1 part) in presence of 0.16 to 0.2% aqueous solution of sodium hydroxide at 25-30° C. for 5 hrs. The resin obtained is filtered using RMfilter and the residue is washed with distilled water till neutral filtrate is obtained. Lignin-formaldehyde resin obtained is used for further preparation of said biofiller of the invention.

According to another preferred embodiment of the invention, there is provided "D" biofiller, where a surface of microcrystalline lignocellulose is treated with 10% acetone and 10% lignin acetone resin.

A method to prepare the "D" biofiller wherein, said process comprises preparing lignin-acetone resin by treating lignin with acetone in presence of 0.2% of aqueous sodium hydroxide solution at 23 to 30° C.;

preparing alkaline solution of acetone by mixing with (2N) aqueous sodium hydroxide solution with acetone and adjusting the pH to 9 to 11 followed by treatment of microcrystalline lignocellulose and lignin-acetone resin to obtain microcrystalline lignocellulose which is surface treated with 10% of acetone and lignin-acetone resin.

Particularly, lignin-acetone resin may be prepared by treating lignin solid (3 part) with acetone solution (1 part) in presence of 0.16 to 0.2% aqueous solution of sodium hydroxide at 25-30° C. for 5 hrs. The resin obtained is filtered using RM filter and the residue is washed with distilled water till neutral filtrate is obtained. Lignin-formaldehyde resin obtained is used for further preparation of said biofiller of the invention.

According to another embodiment of the invention, there is provided "E" biofiller, which is lignin formaldehyde resin, A method to prepare the "E" biofiller wherein, said process comprises preparing lignin-formaldehyde resin by treating lignin with formaldehyde in presence of 0.2% of aqueous sodium hydroxide solution at 23 to 30° C.

Particularly, lignin-formaldehyde resin may be prepared by treating lignin solid (1.1 part) with 37% formaldehyde solution (1 part) in presence of 0.16 to 0.2% aqueous solution of sodium hydroxide at 25-30° C. for 5 hrs. The resin obtained is filtered using RM filter and the residue is washed with distilled water till neutral filtrate is obtained. Lignin-formaldehyde resin obtained is used for further preparation of said biofiller of the invention.

According to another preferred embodiment of the invention, there is provided "F" biofiller, where a surface of microcrystalline lignocellulose is treated with 2% 5-(Hydroxymethyl) furfural (HMF).

A method to prepare the "F" biofiller wherein, said process comprises preparing alkaline solution of 5-(Hydroxymethyl) furfural (HMF) by mixing with (2 N) aqueous sodium hydroxide solution with HMF (63% pure) and adjusting the pH to 9 to 11 followed by treatment of microcrystalline lignocellulose with alkaline solution of HMF so as to obtain microcrystalline lignocellulose which is surface treated with 2% of HMF.

The said biofiller may be used for rubber reinforcement in various applications such as, but not limited to, tyres, shoes, bags, belts etc. for enhancing properties like tensile strength, elongation, modulus, hardness, rheological properties including torque, curing, etc.

According to yet another embodiment of the invention there is provided a cost-effective and eco-friendly rubber composition for the application such as belts, bags, shoes, tyre, etc, said composition comprising diene rubber polymer and 0.5 to 5% wt. said biofiller comprising surface treated lignocellulose with aldehyde and/or ketone of the invention along with carbon black filler and other conventional additive.

Particularly, the rubber composition (control) is prepared by adding Natural Rubber (100 phr), N220 Carbon Black (50 phr), Stearic acid (2.5 phr), Zinc oxide (4.5 phr), Naphthenic process oil (5.5 phr), 6PPD (2 phr), Microcrystalline Wax (0.75 phr), Paraffin Wax (0.5 phr), Sulphur (1.2 phr), and CBS (1 phr) by milling it by conventional method.

Particularly, rubber composition of the invention is prepared by using Biofiller of the invention wherein 2% of Carbon Black is replaced by said biofiller of the invention. Thus, formulations I, II, III, IV, V and VI are prepared by adding Natural Rubber (100 phr), N220 Carbon Black (49 phr), Biofiller "A", "B", "C", "D", "E" and "F" respectively (1 phr), Stearic acid (2.5 phr), Zinc oxide (4.5 phr), Naphthenic process oil (5.5 phr), 6PPD (2 phr), Microcrystalline Wax (0.75 phr), Paraffin Wax (0.5 phr), Sulphur (1.2 phr), and CBS (1 phr) by milling it.

According to still another embodiment of the invention, there is provided a pneumatic tyre that has tread part having been formed of the rubber composition of the invention.

The rubber composition after incorporating 2% of said biofiller of the invention is tested for physical properties of the cured compound compared with respect to the control i.e. tensile strength, elongation, modulus, hardness, tear strength, rheological properties including torque, curing, etc. It was found that rubber composition comprising 2% biofiller of the invention is showing superior results over standard. The said biofiller of the invention found to be efficient and at the same time being biodegradable and eco-friendly. The said biofiller substantially replaces carbon black filler in rubber formulation. Thus, said biofiller of the invention replaces 2% conventional Carbon Black filler which leads to economic significance (10 to 20%) and leads to 20 to 50 Kg $CO_2$ reduction per tonne of tyre produced which reduces pollution substantially. The present method of the preparation of said biofiller of the invention is easy to carry out.

BEST MODE OR EXAMPLES FOR WORKING OF THE INVENTION

The present invention is described in the examples given below; further these are provided only to illustrate the invention and therefore should not be construed to limit the scope of the invention.

Reference Example

Lignocellulose solid was treated with 2.5 N HCl at 95° C. for 100 minutes. The reaction material obtained was filtered through RM filter and solids so obtained were washed with distilled water till neutral wash was obtained. The solid powder so obtained was dried at 85° C. and microcrystalline lignocellulose so obtained was further used for preparing biofiller. Microcrystalline lignocellulose was analyzed for particle size distribution, surface area and aspect ratio and the results obtained are as follows:

The particle size distribution: up to 50 Micron,
The specific surface area 1 $m^2$/gm (by BET Nitrogen Adsorption As Per USP):
Aspect ratio (Mean): 1.3812

Example 1

("A" Biofiller)

Alkaline acetone was prepared by mixing 50 ml of 20% (w/v) aqueous solution of Acetone with 2 N of aqueous sodium hydroxide solution and adjusting the pH of the solution to 9.2. The alkaline acetone solution (7.5 gm) was added to 30 gm of the microcrystalline lignocellulose (obtained from reference example) and was allowed to react by stirring to obtain the biofiller containing microcrystalline lignocellulose surface treated with 5% acetone. Completion of the reaction was monitored by titrimetric analysis for consumption of acetone by oximation. The product was dried at 80° C. for 5 hrs.

The sample thus prepared was allowed to stand at room temperature for at least 24 hrs and biofiller "A" was used for preparation of rubber compound.

The rubber composition "I" was prepared by adding Natural Rubber (100 phr), N220 Carbon Black (49 phr), Biofiller "A" (1 phr), Stearic acid (2.5 phr), Zinc oxide (4.5 phr), Naphthenic process oil (5.5 phr), 6PPD (2 phr), Microcrystalline Wax (0.75 phr), Paraffin Wax (0.5 phr), Sulphur (1.2 phr), and CBS (1 phr) together and milling it.

Example 2

("B" Biofiller)

Alkaline solution of formaldehyde was prepared by mixing 10 gm of 37% pure formaldehyde with 2N Sodium hydroxide solution and adjusting the pH of the solution to 9.2. The alkaline formaldehyde solution (8.11 gm) was added to 30 gm of the microcrystalline lignocellulose (obtained from reference example) and was allowed to react by stirring to obtain the biofiller containing microcrystalline lignocellulose surface treated with 10% formaldehyde. The reaction completion was monitored by using titrimetric analysis for consumption of formaldehyde. The product was dried at 80° C. for 5 hrs.

The sample thus prepared was allowed to stand at room temperature for at least 24 hrs and biofiller "B" was used for preparation of rubber compound.

The rubber composition "II" was prepared by adding Natural Rubber (100 phr), N220 Carbon Black (49 phr), Biofiller "B" (1 phr), Stearic acid (2.5 phr), Zinc oxide (4.5 phr), Naphthenic process oil (5.5 phr), 6PPD (2 phr), Microcrystalline Wax (0.75 phr), Paraffin Wax (0.5 phr), Sulphur (1.2 phr), and CBS (1 phr) together and milling it.

Example 3

("C" Biofiller)

Lignin (13.5 gm) was charged to 250 ml round bottom flask fitted with overhead stirrer, reflux condenser and thermometer pocket. To this, 200 ml of 0.2% aqueous NaOH solution was added followed by drop wise addition of 37% formaldehyde (12.15 gm). The reaction mass was stirred at 30° C. for 5 hrs. The reaction completion was monitored by using titrimetric analysis for consumption of formaldehyde. Then it was filtered and cake was washed with distilled water till the wash obtained was neutral. The product lignin-formaldehyde obtained was dried at 80° C. for 5 hrs and used for further processing.

Alkaline solution of formaldehyde was prepared by mixing 10 gm of 37% pure formaldehyde with 2N Sodium hydroxide solution and adjusting the pH of the solution to 10.14. The alkaline formaldehyde solution (8.92 gm) was added to 3 gm of lignin-formaldehyde and 30 gm of microcrystalline lignocellulose (obtained from reference example) and was allowed to react by stirring to obtain the biofiller containing microcrystalline lignocellulose surface treated with 10% formaldehyde and lignin-formaldehyde. The reaction completion was monitored by using titrimetric analysis for consumption of formaldehyde. The product was dried at 80° C. for 5 hrs.

The sample thus prepared was allowed to stand at room temperature for at least 24 hrs and biofiller "C" was used for preparation of rubber compound.

The rubber composition "III" was prepared by adding Natural Rubber (100 phr), N220 Carbon Black (49 phr), Biofiller "C" (1 phr), Stearic acid (2.5 phr), Zinc oxide (4.5 phr), Naphthenic process oil (5.5 phr), 6PPD (2 phr), Microcrystalline Wax (0.75 phr), Paraffin Wax (0.5 phr), Sulphur (1.2 phr), and CBS (1 phr) together and milling it.

Example 4

("D" Biofiller)

Lignin (13.5 gm) was charged to 250 ml round bottom flask fitted with overhead stirrer, reflux condenser and thermometer pocket. To this, 200 ml of 0.2% aqueous NaOH solution was added followed by drop wise addition of acetone (4.5 gm). The reaction mass was stirred at 30° C. for 5 hrs. The completion of the reaction was monitored by titrimetric analysis for consumption of acetone by oximation. Then it was filtered and cake was washed with distilled water till the wash obtained was neutral. The product lignin-acetone obtained was dried at 80° C. for 5 hrs and used for further processing.

The alkaline solution of acetone was prepared by mixing 10 gm of acetone with 2N Sodium hydroxide solution and adjusting the pH of the solution to 10.25. The alkaline acetone solution (3.3 gm) was added to 3 gm of lignin-acetone and 30 gm of microcrystalline lignocellulose (obtained from reference example) and was allowed to react by stirring to obtain the biofiller containing microcrystalline lignocellulose surface treated with acetone and lignin-acetone. The completion of the reaction was monitored by titrimetric analysis for consumption of acetone by oximation. The product was dried at 80° C. for 5 hrs.

The sample thus prepared was allowed to stand at room temperature for at least 24 hrs and biofiller "D" was used for preparation of rubber compound.

The rubber composition "IV" was prepared by adding Natural Rubber (100 phr), N220 Carbon Black (49 phr), Biofiller "D" (1 phr), Stearic acid (2.5 phr), Zinc oxide (4.5 phr), Naphthenic process oil (5.5 phr), 6PPD (2 phr), Microcrystalline Wax (0.75 phr), Paraffin Wax (0.5 phr), Sulphur (1.2 phr), and CBS (1 phr) together and milling it.

Example 5

("E" Biofiller)

Lignin (13.5 gm) was charged to 250 ml round bottom flask fitted with overhead stirrer, reflux condenser and thermometer pocket. To this, 200 ml of 0.2% aqueous NaOH solution was added followed by drop wise addition of 37% formaldehyde (12.15 gm). The reaction mass was stirred at 25° C. for 5 hrs. Reaction completion was monitored by using titrimetric analysis for consumption of formaldehyde. Then it was filtered and cake was washed with distilled water till the wash obtained was neutral. The product lignin-formaldehyde obtained was dried at 80° C. for 5 hrs.

The sample thus prepared was allowed to stand at room temperature for at least 24 hrs and biofiller "E" was used for preparation of rubber compound.

The rubber composition "V" was prepared by adding Natural Rubber (100 phr), N220 Carbon Black (49 phr), Biofiller "E" (1 phr), Stearic acid (2.5 phr), Zinc oxide (4.5 phr), Naphthenic process oil (5.5 phr), 6PPD (2 phr), Microcrystalline Wax (0.75 phr), Paraffin Wax (0.5 phr), Sulphur (1.2 phr), and CBS (1 phr) together and milling it.

Example 6

("F" Biofiller)

Alkaline solution of 5-(Hydroxymethyl) furfural (HMF) was prepared by mixing 10 gm of 5-(Hydroxymethyl) furfural (63% pure) with 2N Sodium hydroxide solution and adjusting the pH of the solution to 10.48. The alkaline HMF solution (0.95 gm) was added to 30 gm of the microcrystalline lignocellulose (obtained from reference example) and was allowed to react by stirring to obtain the biofiller containing microcrystalline lignocellulose surface treated with 2% HMF. The reaction completion was monitored by using titrimetric analysis for consumption of aldehyde. The product was dried at 80° C. for 5 hrs.

The sample thus prepared was allowed to stand at room temperature for at least 24 hrs and biofiller "F" was used for preparation of rubber compound.

The rubber composition "VI" was prepared by adding Natural Rubber (100 phr), N220 Carbon Black (49 phr), Biofiller "F" (1 phr), Stearic acid (2.5 phr), Zinc oxide (4.5 phr), Naphthenic process oil (5.5 phr), 6PPD (2 phr), Microcrystalline Wax (0.75 phr), Paraffin Wax (0.5 phr), Sulphur (1.2 phr), and CBS (1 phr) together and milling it.

The base rubber composition was prepared by adding Natural Rubber (100 phr), N220 Carbon Black (50 phr), Stearic acid (2.5 phr), Zinc oxide (4.5 phr), Naphthenic process oil (5.5 phr), 6PPD (2 phr), Microcrystalline Wax (0.75 phr), Paraffin Wax (0.5 phr), Sulphur (1.2 phr), and CBS (1 phr) together and milling it. This base rubber composition was used as control for further studies. The control composition was air cured and used comparative study.

Rubber compositions "I", "II" "III", "IV", "V" and "VI" having said biofiller "A", "B", "C", "D", "E" and "F" prepared according to Examples 1 to 6 respectively were air cured and physical properties of the cured rubber compositions compared with the control.

The cured rubber composition of the invention and control were tested for tensile strength, elongation, modulus, hardness, tear strength, rheological properties including torque, curing, etc. The results are tabulated in Table 1:

TABLE 1

Results for tensile & rheological tests for the rubber compositions "I", "II", "III", "IV", "V", "VI" and "Control"

| Test | Unit | Control | I | II | III | IV | V | VI |
|---|---|---|---|---|---|---|---|---|
| Tensile strength | Kg/cm2 | 100 | 102 | 105 | 104 | 109 | 100 | 102 |
| Elongation at break | % | 100 | 100 | 101 | 101 | 104 | 100 | 99 |
| Modulus at 300% | Kg/cm2 | 100 | 104 | 105 | 108 | 108 | 103 | 100 |
| Hardness | Shore A | 100 | 99 | 100 | 100 | 101 | 99 | 100 |
| MH | lb · inch | 100 | 98 | 97 | 96 | 95 | 98 | 99 |
| ML | lb · inch | 100 | 99 | 96 | 97 | 96 | 99 | 98 |
| Tc90 | min | 100 | 99 | 97 | 97 | 96 | 102 | 98 |
| Ts2 | min | 100 | 100 | 100 | 99 | 100 | 100 | 100 |

Results have shown that the rubber compositions "I", "II", "III", "IV", "V", and "VI" are not only comparable but in certain criterions they are superior to the "Control" with only Carbon Black as filler. The cost of the products "I" to "VI" is reduced to 10 to 20% as 2% carbon black is replaced by the said biofiller of the invention and pollution is also reduced substantially in view of overall consumption of carbon black with 90% of global carbon black market. The said biofiller of the invention may be used in rubber compositions for various applications such as, but not limited to, tyres, shoes, bags, belts etc.

We claim:

1. A biofiller for rubber reinforcement comprising a microcrystalline lignocellulose which is surface treated with 1 to 10% by weight of aldehyde and/or ketone, wherein the microcrystalline lignocellulose is prepared by treating the lignocellulose with dilute hydrochloric acid at 80 to 100° C. for at least 100 to 120 minutes to produce microcrystalline lignocellulose having a particle size 1 to 60µ, surface area 1 to 20 m²/gm and aspect ratio (Mean): 1 to 2.

2. The biofiller as claimed in claim 1, wherein said aldehyde and ketone are selected from the group consisting of formaldehyde, acetaldehyde, propanaldehyde, butanaldehyde, pentyl aldehyde, hexanaldehyde, heptanaldehyde, octanaldehyde, nonaldehyde, decanal, Sorbaldehyde, Crotonaldehyde, 5-Hydroxymethyl furfural, acrolein, acetone, butanone, pentanone, hexanone, heptanone, octanone, nonanone, and decanone.

3. A cost-effective and eco-friendly rubber composition comprising diene rubber polymer and 0.5 to 5% wt. of said biofiller as claimed in claim 1 along with carbon black filler and other conventional additives.

4. A pneumatic tire that has a tread part having been formed of a cost-effective and eco-friendly rubber composition comprising diene rubber polymer and 0.5 to 5% wt. of said biofiller as claimed in claim 1 along with carbon black filler and other conventional additives.

5. A biofiller for rubber reinforcement comprising:
   a microcrystalline lignocellulose which is surface treated with 1 to 10% by weight of aldehyde and/or ketone, and
   a lignin-formaldehyde or lignin-acetone resins along with the microcrystalline lignocellulose.

6. The biofiller as claimed in claim 5, wherein said aldehyde and ketone are selected from the group consisting of formaldehyde, acetaldehyde, propanaldehyde, butanaldehyde, pentyl aldehyde, hexanaldehyde, heptanaldehyde, octanaldehyde, nonaldehyde, decanal, Sorbaldehyde, Crotonaldehyde, 5-Hydroxymethyl furfural, acrolein, acetone, butanone, pentanone, hexanone, heptanone, octanone, nonanone, and decanone.

7. A cost-effective and eco-friendly rubber composition comprising diene rubber polymer and 0.5 to 5% wt. of the biofiller comprising surface treated lignocellulose with aldehyde and/or ketone as claimed in claim 5 along with carbon black filler and other conventional additives.

8. A pneumatic tire that has a tread part having been formed of a cost-effective and eco-friendly rubber composition comprising diene rubber polymer and 0.5 to 5% wt. of the biofiller comprising surface treated lignocellulose with aldehyde and/or ketone as claimed in claim 5 along with carbon black filler and other conventional additives.

9. A method for the preparation of a biofiller for rubber reinforcement, said method comprising the steps of:
   treating lignocellulose with dilute hydrochloric acid at 80 to 100° C. for at least 100 to 120 minutes to produce microcrystalline lignocellulose having a particle size 1 to 60μ, surface area 1 to 20 m²/gm and aspect ratio (Mean): 1 to 2; and
   surface treating the microcrystalline lignocellulose with 1 to 10% of aldehyde and/or ketone in presence of aqueous alkali to produce the biofiller.

10. The method as claimed in claim 9, wherein the step of surface treating includes a step of preparing an alkaline solution of aldehyde and ketone by mixing with aqueous alkali and adjusting the pH to 9 to 11 followed by treatment of microcrystalline lignocellulose with alkaline solution of aldehyde and ketone at 23 to 30° C. so as to obtain microcrystalline lignocellulose which is surface treated with 1 to 10% of aldehyde and/or ketone.

11. The method as claimed in claim 9, wherein the step of surface treating, further includes the step of adding a lignin-formaldehyde resin or a lignin-acetone resin to the microcrystalline lignocellulose.

12. The method as claimed in claim 9, wherein said aldehyde and ketone are selected from the group consisting of formaldehyde, acetaldehyde, propanaldehyde, butanaldehyde, pentyl aldehyde, hexanaldehyde, heptanaldehyde, octanaldehyde, nonaldehyde, decanal, Sorbaldehyde, Crotonaldehyde, 5-Hydroxymethyl furfural, acrolein, acetone, butanone, pentanone, hexanone, heptanone, octanone, nonanone, and decanone.

13. A cost-effective and eco-friendly rubber composition comprising diene rubber polymer and 0.5 to 5% wt. of said biofiller prepared according to the method of claim 9 along with carbon black filler and other conventional additives.

14. A pneumatic tire that has a tread part having been formed of a cost-effective and eco-friendly rubber composition comprising diene rubber polymer and 0.5 to 5% wt. of said biofiller prepared according to the method of claim 9 along with carbon black filler and other conventional additives.

* * * * *